(12) United States Patent
St-Pierre et al.

(10) Patent No.: US 9,315,225 B2
(45) Date of Patent: Apr. 19, 2016

(54) SEGMENTED TRACK AND TRACK SEGMENT THEREFOR

(75) Inventors: Yves St-Pierre, Wickham (CA); Marc-Antoine Leblanc, Saint-Cyrille-de-Wendover (CA); Danny Roy, Drummondville (CA); François Duquette, Drummondville (CA); Tommy Marcotte, Saint-Cyrille-de-Wendover (CA); Vincent Blouin, Drummondville (CA); Roméo Lussier, Sherbrooke (CA)

(73) Assignee: Soucy International Inc., Drummondville, Quebec (CA)

( * ) Notice: Subject to any disclaimer, the term of this patent is extended or adjusted under 35 U.S.C. 154(b) by 278 days.

(21) Appl. No.: 14/110,784

(22) PCT Filed: Apr. 19, 2012

(86) PCT No.: PCT/CA2012/000400
§ 371 (c)(1),
(2), (4) Date: Oct. 9, 2013

(87) PCT Pub. No.: WO2012/142705
PCT Pub. Date: Oct. 26, 2012

(65) Prior Publication Data
US 2014/0028085 A1   Jan. 30, 2014

Related U.S. Application Data

(60) Provisional application No. 61/476,808, filed on Apr. 19, 2011.

(51) Int. Cl.
*B62D 55/26* (2006.01)
*B62D 55/24* (2006.01)

(52) U.S. Cl.
CPC .............. *B62D 55/26* (2013.01); *B62D 55/24* (2013.01); *B62D 55/244* (2013.01)

(58) Field of Classification Search
CPC ...... B62D 55/24; B62D 55/253; B62D 55/26; B62D 55/28
USPC ........................................... 305/158
See application file for complete search history.

(56) References Cited

U.S. PATENT DOCUMENTS 3,734,576 A * 5/1973 Heiple ................. B62D 55/253
305/158
4,056,289 A * 11/1977 Gilliland ................ A63B 19/02
305/120

(Continued)

FOREIGN PATENT DOCUMENTS

JP          04133877 A  *  5/1992

*Primary Examiner* — Kip T Kotter
(74) *Attorney, Agent, or Firm* — Robert Brouillette; Brouillette & Partners

(57) ABSTRACT

A segmented track made of a plurality of elastomeric track segments is disclosed. Each track segment is made of reinforced elastomeric material and is provided, at each end thereof, with a joint element adapted to be connected to the joint element of adjacent track segments. Each track segment generally comprises alternating series of substantially rigid sections and substantially flexible sections. The joint elements of the track segments are substantially located within rigid sections located at the extremities of the track segments. The segment track also comprises inner and outer plates configured to secure the joint elements of adjacent track segments together.

17 Claims, 17 Drawing Sheets

(56) References Cited

U.S. PATENT DOCUMENTS

| | | | | |
|---|---|---|---|---|
| 4,953,920 A * | 9/1990 | Jager | ............ | B62D 55/205 |
| | | | | 305/165 |
| 5,058,963 A * | 10/1991 | Wiesner | ............ | B62D 55/24 |
| | | | | 305/158 |
| 6,517,173 B1 * | 2/2003 | Oberlander | ............ | B62D 55/24 |
| | | | | 305/152 |
| 7,396,091 B2 * | 7/2008 | Welp | ............ | B62D 55/275 |
| | | | | 305/158 |
| 8,672,424 B2 * | 3/2014 | Tucker, Jr. | ............ | B62D 55/244 |
| | | | | 305/180 |
| 2004/0016578 A1 * | 1/2004 | St-Pierre | ............ | B62D 55/04 |
| | | | | 180/9.26 |
| 2008/0018173 A1 * | 1/2008 | Kremer | ............ | B62D 55/14 |
| | | | | 305/193 |
| 2009/0218882 A1 * | 9/2009 | Rowbottom | ............ | B62D 55/21 |
| | | | | 305/158 |
| 2011/0037313 A1 * | 2/2011 | Delisle | ............ | B62D 55/20 |
| | | | | 305/158 |
| 2012/0049618 A1 * | 3/2012 | Baum | ............ | B62D 55/202 |
| | | | | 305/159 |

* cited by examiner

SEGMENTED TRACK AND TRACK SEGMENT THEREFOR

CROSS-REFERENCE TO RELATED APPLICATIONS

The present patent application claims the benefits of priority of U.S. Provisional Patent Application No. 61/476,808, entitled "Segmented Track and Track Segment Therefor" and filed at the United States Patent and Trademark Office on Apr. 19, 2011.

FIELD OF THE INVENTION

The present invention generally relates to segmented traction bands and endless tracks for use on tracked vehicles and other vehicles using tracks for propulsion. More particularly, but without being limitative in nature, the present invention relates to segmented tracks for use of heavy tracked vehicles such as military vehicles, agricultural vehicles, construction vehicles, forestry vehicles and industrial vehicles.

BACKGROUND OF THE INVENTION

It has long been recognized that unitary endless elastomeric tracks had the fundamental problem of becoming mostly useless upon being damaged. Indeed, once such a track is damaged, it generally has to be completely replaced by a new elastomeric track. This can be particularly difficult in some contexts such as on a battle field or in a construction zone.

To mitigate this problem while keeping the main advantages of elastomeric tracks (i.e. reduced noise, reduced weight, reduced damages on pavement, etc.), elastomeric tracks have sometimes been made of a plurality of interconnected elastomeric segments instead of being unitary.

Though elastomeric segmented tracks have their inherent advantages, such as providing the ability to replace only damaged or worn out segment or segments, segmented tracks also have their problems.

For instance, in order to connect each segment together, each segment is provided with joints. However, joints create discontinuities in the elastomeric material and in the longitudinal reinforcements (e.g. reinforcing cables or cords) where failures typically occur. Several segmented tracks have been proposed throughout the years to try to mitigate this and other problems. See for instance, U.S. Pat. Nos. 2,338,819; 2,385,453; 2,402,042; 3,151,443; 3,212,627; 3,734,576; 5,058,963 and 7,396,091.

However, the foregoing segmented elastomeric tracks were not designed nor configured to be used on heavy tracked vehicles such as military vehicles, agricultural vehicles, construction vehicles, forestry vehicles and industrial vehicles. Heavy tracked vehicles, due to their inherent large size and weight, need to have tracks which, on the one hand, provide a large ground-contacting surface, and, on the other hand, are flexible enough to wrap around the various wheels of the vehicle (e.g. sprocket wheel, idler wheel and road wheels) and to absorb some temporary deformations.

Consequently, elastomeric tracks used on heavy track vehicles typically comprise several longitudinally extending substantially rigid sections (where inner and outer lugs are generally located) interconnected by generally shorter flexible and pliable sections (where bending generally occurs). Moreover, to maximize the ground-contacting surface of the track, the length of the flexible sections is usually significantly shorter than the length of the rigid sections.

In addition, the joint elements interconnecting the track segments need to be strong enough to support the longitudinal forces exerted by the vehicle during operation, and durable enough to prevent premature wearing. Unfortunately, prior art segmented track configurations failed to address such segmented track design considerations and are therefore of very limited use on heavier vehicles.

Hence, despite ongoing development in the field of segmented traction bands and endless tracks, there is still a need for a novel segmented track which mitigates the shortcomings of the prior art and which addresses the needs of segmented traction bands and endless tracks used particularly on heavy tracked vehicles.

SUMMARY OF THE INVENTION

The principles of the present invention are generally embodied in a segmented track and track segments therefor.

Hence, a segmented track in accordance with the principles of the present invention typically comprises a plurality of track segments connected end-to-end, each track segment comprising a longitudinally extending segment body made from reinforced elastomeric material and having embedded therein, at each end thereof, a joint member.

The segment body has an outer ground-engaging surface and an inner wheel-engaging surface and is further longitudinally partitioned into a plurality of substantially rigid sections interconnected by substantially flexible sections.

Each rigid section is provided, on its outer surface, with one or more traction lugs generally defining a thread pattern, and, on its inner surface, with laterally spaced-apart drive lugs and/or guide lugs defining wheel paths therebetween.

The traction lugs are configured to engage the ground and to provide traction whereas the drive lugs are configured to engage and mesh with the sprocket wheel of the vehicle. For their part, the guide lugs are generally configured to guide the track over the various wheels (i.e. sprocket wheel, idler wheel and road wheels) of the vehicle and to prevent occurrences of detracking.

In order to remain flexible, the flexible sections connecting adjacent rigid sections are preferably devoid of any lugs.

Understandably, to allow connection with adjacent track segments, each track segment comprises two joint members, one at each end of the segment.

In accordance with an aspect of the present invention, in each track segment, the joint members are located in rigid sections located at the extremities of the track segment. So located, when the joint members of two adjacent track segments are connected together, they remain located in a common rigid section.

To secure two joint members together, the segmented track comprises inner and outer plate assemblies which are typically fastened (e.g. bolted) together and to the joint members.

To assure some continuity in the segment track, the inner plate assembly comprises drive lugs and/or guide lugs in a configuration typically similar to the rest of the inner surface of the track segments. Similarly, the outer plate assembly comprises traction lug(s) in a configuration typically similar to the rest of the outer surface of the track segments.

In accordance with another aspect of the present invention, each track segment comprises longitudinal reinforcing elements (e.g. longitudinally extending reinforcing cables) embedded into the body of the track segment. The longitudinally extending reinforcing elements are attached to and extending between the joint members.

In accordance with the principles of the present invention, as the connections between joint members of adjacent track segments are located in rigid sections which are further covered by inner and outer plate assemblies, the connections between the joint members are effectively substantially shielded from the elements (e.g. dust, sand, rocks, debris, etc.) and are thus less susceptible to premature wearing as opposed to prior are hinge joints which are usually exposed to the elements.

The invention is further directed to a track segment comprising a segment body made of reinforced elastomeric material and comprising an outer ground-engaging surface, an inner wheel-engaging surface, a first lateral edge, a second lateral edge, a first extremity and a second extremity, the segment body comprising a plurality of laterally extending and substantially rigid lug-bearing sections which are interconnected by laterally extending and substantially flexible lug-less sections, each of the lug-bearing sections comprising, on the inner surface, at least one inner lug, and, on the outer surface, at least one outer lug, the segment body being respectively terminated, at the first and second extremities, by two of the lug-less sections, the track segment comprising a first joint element mounted at the first extremity of the segment body, and a second joint element mounted at the second extremity of the segment body, the first and second joint elements being configured to form a common substantially rigid joint section when connected together, wherein the first joint element comprises a first joint portion and a first anchoring portion, and wherein the second joint element comprises a second joint portion and a second anchoring portion; and wherein the first joint portion has a first dovetail configuration, and wherein the second joint portion has a second dovetail configuration which is complementary to the first dovetail configuration.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel segmented track, and its constituents, will be described hereinafter. Although the invention is described in terms of specific illustrative embodiments, it is to be understood that the embodiments described herein are by way of example only and that the scope of the invention is not intended to be limited thereby.

Figure 1:
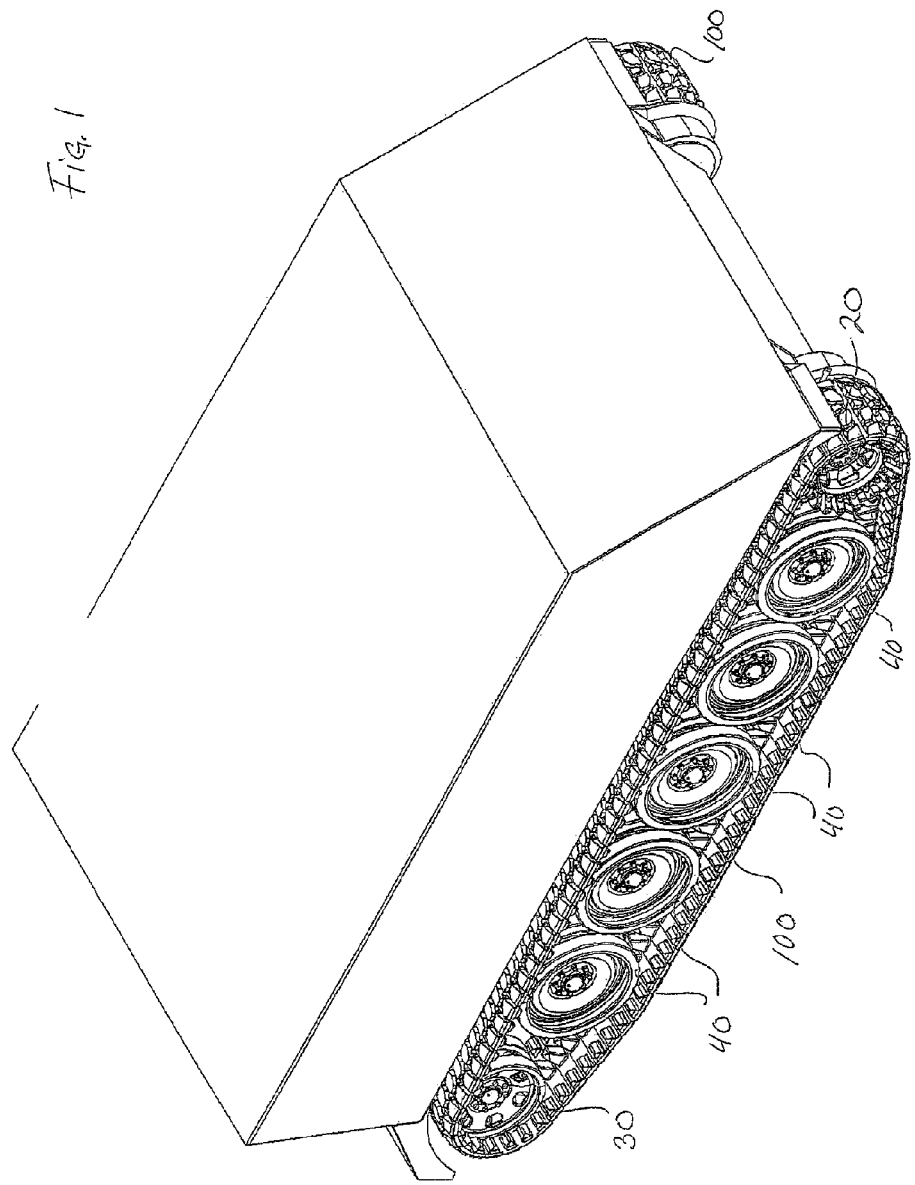
FIG. 1 is a perspective view of an exemplary vehicle equipped with a pair of segmented tracks in accordance with the principles of the present invention.

Referring first to FIG. 1, segmented tracks 100 made in accordance with the principles of the present invention are shown mounted on a military vehicle 10. In the present embodiment, the vehicle 10 is a conventional armored personnel carrier (e.g. a M113 armored personnel carrier) and comprises, on each side thereof, a sprocket wheel 20 mounted at the front end, an idler wheel 30 mounted at the rear end, and several road wheels 40 mounted along the length of the vehicle 10.

The sprocket wheel 20 is generally configured to engage the track 100 and to transmit the motive power from the motor (not shown) of the vehicle 10 to the track 100. For its part, the idler wheel 30 is configured to tension and to guide the track 100 at the rear end of the vehicle 10. Finally, in the present embodiment, the road wheels 40 are generally configured to guide the lower run portion of the track 100 which engages the ground during use.

The segmented track 100 comprises at least one but typically several track segments 200, about to be described, which are connected end-to-end such as to define an endless loop as best illustrated in FIG. 1.

Figure 2:
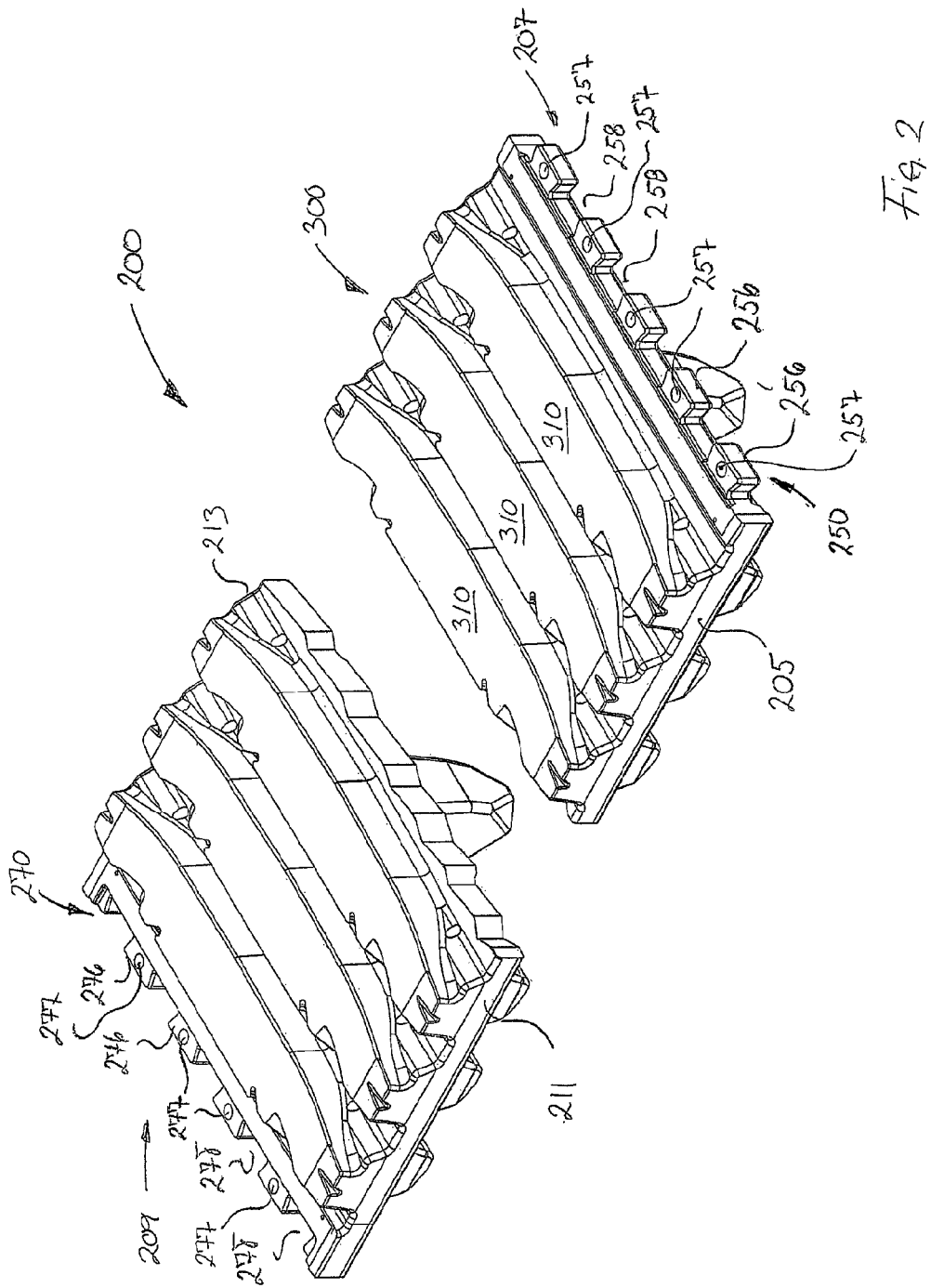
FIG. 2 is a fragmentary perspective view of the exterior of a track segment in accordance with the principles of the present invention.
Figure 3:
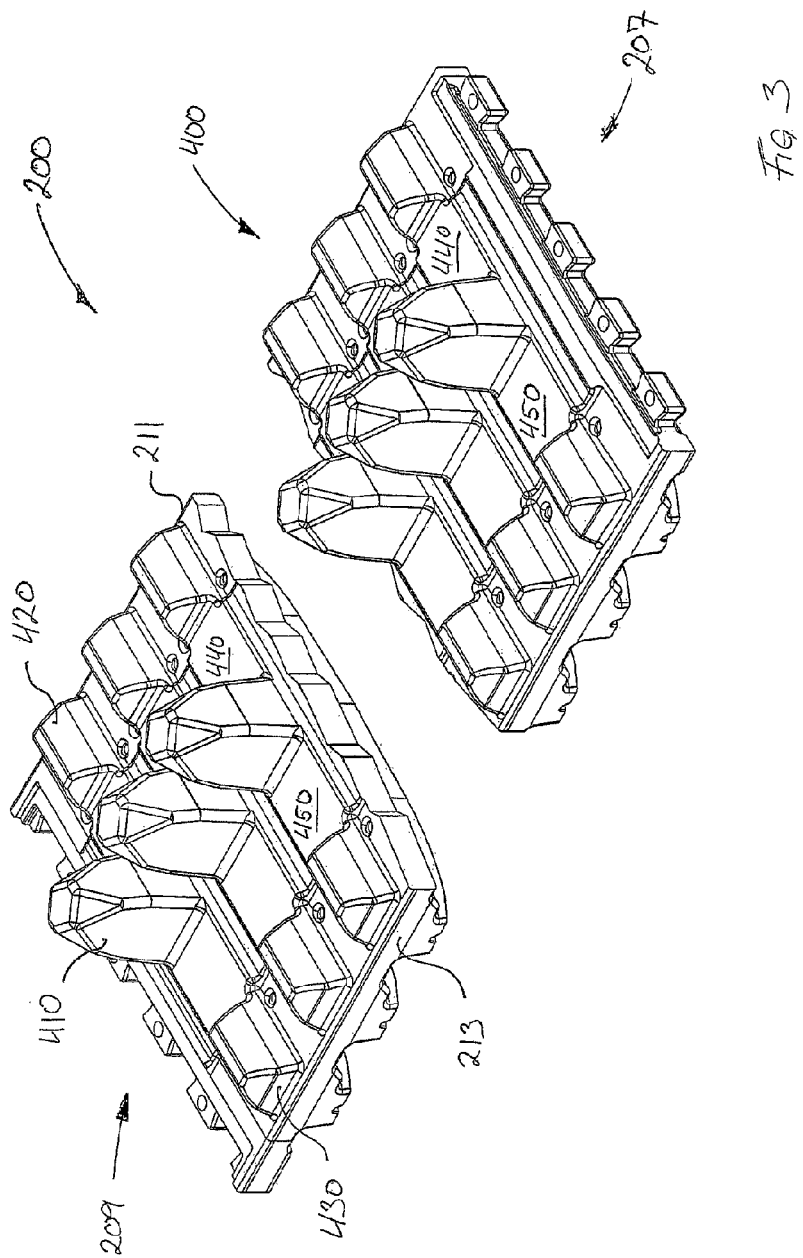
FIG. 3 is a fragmentary perspective view of the interior of the track segment of FIG. 2.

Referring now to FIGS. 2 and 3, a track segment 200 is shown in more details.

Each track segment 200 is made from reinforced elastomeric material and generally comprises a basic body or carcass 205 having an outer ground-engaging surface 300 and an inner wheel-engaging surface 400.

The body 205 defines a first extremity 207, and second opposite extremity 209, a first side edge 211 and a second opposite side edge 213. The body 205 also defines a neutral axis 215 (see FIG. 8) where the elastomeric material of the body 205 is subjected neither to tension nor to compression when the body 205 bends or flexes. Understandably, the track segments 205 can be of varying length as indicated by the broken lines in FIGS. 2 and 3.

Figure 8:
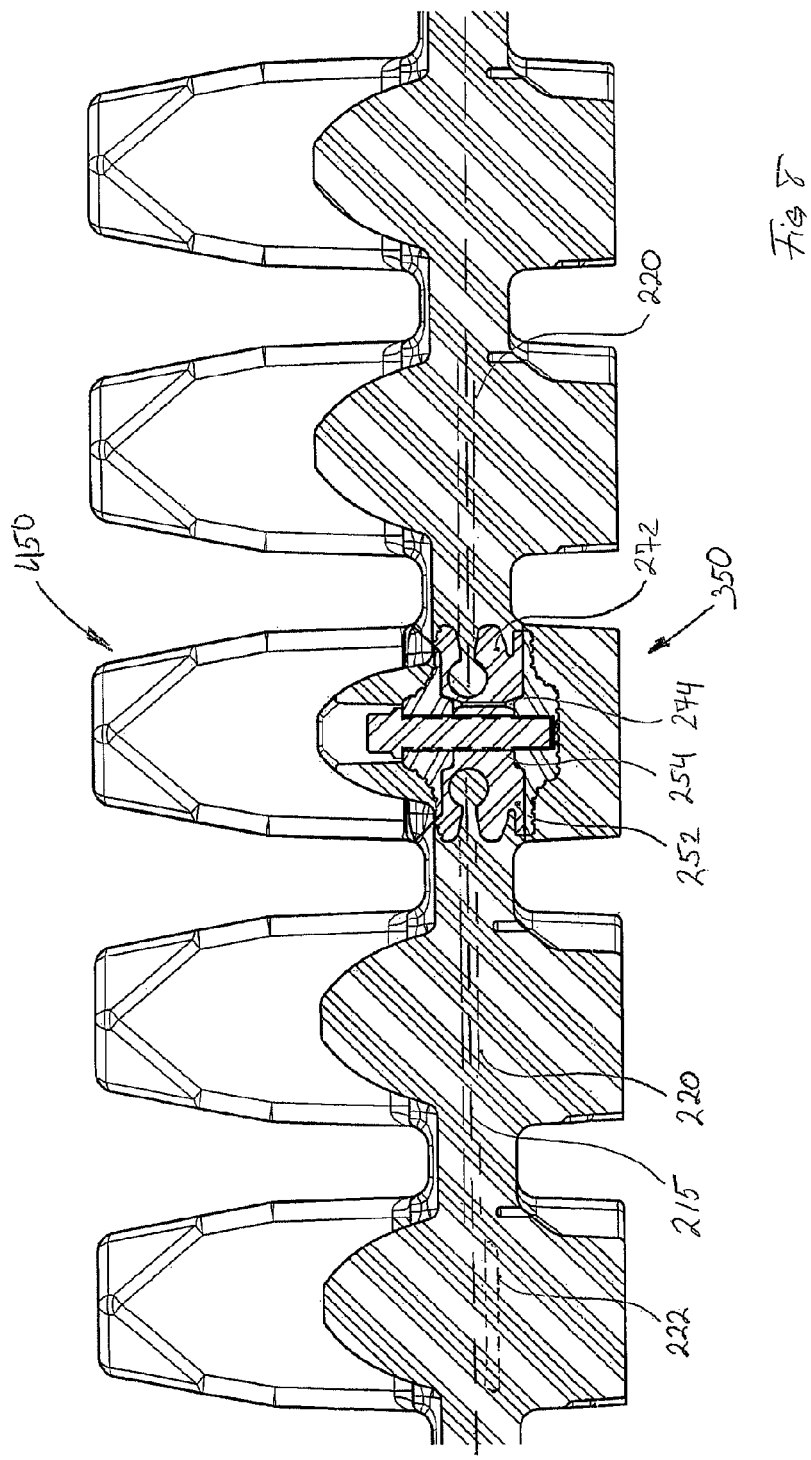
FIG. 8 is a fragmentary cross-sectional side view of the two portions of the track segments of FIG. 7.

Referring to FIG. 8, the body 205 is typically reinforced with longitudinally extending reinforcing elements 220 (e.g. longitudinally extending reinforcing cables) typically located at the neutral axis 215, and with laterally extending reinforcing elements 222 (laterally extending rods). For clarity, and since they are known in the art, the longitudinally extending reinforcing elements 220 and the laterally extending reinforcing elements 222 are shown in phantom lines and only partially.

The outer surface 300 comprises one or more tread or traction lugs 310 (collectively referred to as outer lugs) which are configured to engage the ground over which the vehicle 10 is operated. The traction lug(s) 310 of all the sections of the track segment 200 generally define a tread pattern.

The inner surface 400 comprises one or more rows of longitudinally aligned drive lugs and/or guide lugs (collectively referred to as inner lugs). In the present embodiment, the inner surface 400 comprises one row of substantially centrally located guide lugs 410 and two rows of drives lugs 420 and 430 respectively located substantially along the side edges 211 and 213 of the track segment 200.

The guide lugs 410 are generally configured to guide the track 100 over the various wheels 20, 30 and 40 of the vehicle 10 and to prevent occurrences of detracking. The guide lugs 410 are typically not positively driven nor engaged by the sprocket wheel 20. For their parts, the drive lugs 420 and 430 are configured to be drivingly engaged by the sprocket wheel 20 of the vehicle 10.

In the present embodiment, the rows of guide lugs 410 and drive lugs 420 and 430 are laterally spaced apart such as to define wheelpaths 440 and 450 for the different wheels 20, 30 and 40 of the vehicle 10.

Understandably, in other embodiments, there could be more or less than two rows of drive lugs 420, 430 and the row or rows of drive lugs 420, 430 could be located elsewhere along the width of the track segment 200. Similarly, in other embodiments, there could be more than one row of guide lugs 410 and the row or rows of guide lugs 410 could be located elsewhere along the width of the track segment 200.

Also, though in the present embodiment, the guide lugs 410 are typically not positively driven nor engaged by the sprocket wheel 20, in other embodiments, the guide lugs 410 could possibly be driven by the sprocket wheel 20. In such embodiments, the guide lugs 410 would act both as guide lugs and as drive lugs.

Figure 7:
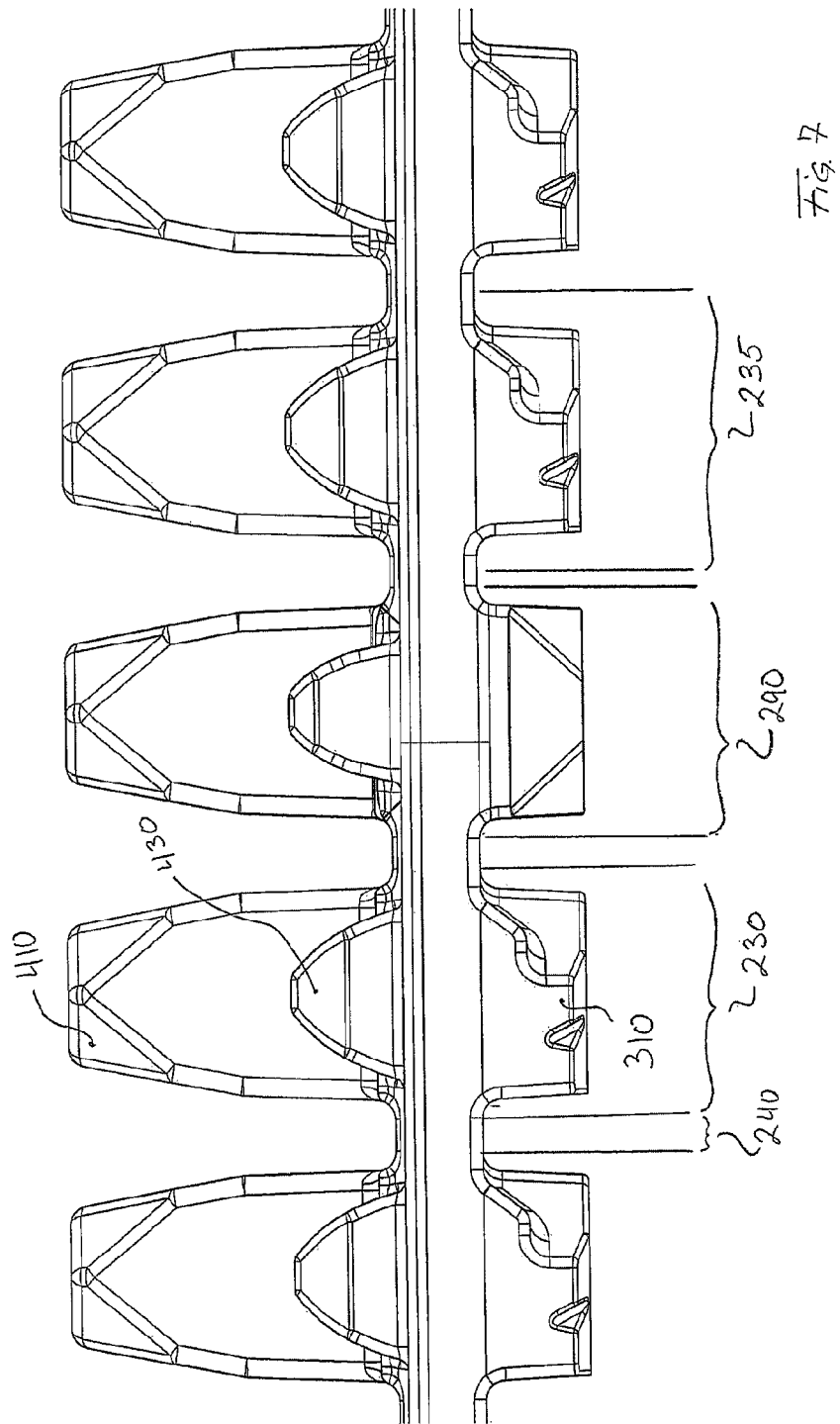
FIG. 7 is a fragmentary side view of the two portions of the track segments of FIG. 6, assembled.

Referring to FIG. 7, the outer traction lugs 310 and the inner guide lugs 410 and drive lugs 420 and 430 are generally laterally aligned along substantially rigid sections 230 which are interconnected by flexible and pliable sections 240 which are devoid of any lugs. The alternating pattern of rigid sections 220 and flexible sections 240 generally defines a pitch 235 which is generally repeated along the length of the track segment 200.

Rigid sections 230 typically have embedded therein the laterally extending reinforcing elements 222 (see FIG. 8). Sections 240 are substantially flexible and pliable such as to allow the segment 200, and the track 100, to bend around the various wheels 20, 30 and 40 of the vehicle 10. In that sense, the thickness of the body 205 may be thinner along the flexible sections 240 than along the rigid sections 230.

Referring back to FIGS. 2 and 3, the track segment 200 also comprises a first joint member 250 located at the first extremity 207 and a second joint member 270 located at the second extremity 209.

As best shown in FIGS. 7 and 8, joint members 250 and 270 are configured to form a common rigid joint section 290 when they are engaged to each other and further fastened with outer plate assembly 350 and inner plate assembly 450.

In the present embodiment, joint members 250 and 270 respectively comprise anchoring portions 252 and 272, and joint portions 254 and 274.

The anchoring portions 252 and 272 are generally similar in configuration and are configured to receive and retain the extremities of the longitudinally extending reinforcing elements 220. In the present embodiment, the anchoring portions 252 and 272 are generally C-shaped such as to receive and retain the enlarged fittings (or balls) secured at the extremities of the longitudinally extending reinforcing elements 220.

The joint portions 254 and 274 are configured as dovetail joints and are complementary to each other.

Referring to FIGS. 2 and 3, in the present embodiment, joint portion 254 comprises five outwardly extending tails 256 spaced apart by four recesses 258. Complementarily, joint portion 274 comprises five recesses 278, configured to receive the five tails 256 of an adjacent segment 200, and four tails 276, configured to be received in the four recesses 258 of an adjacent track segment 200.

Figure 10:
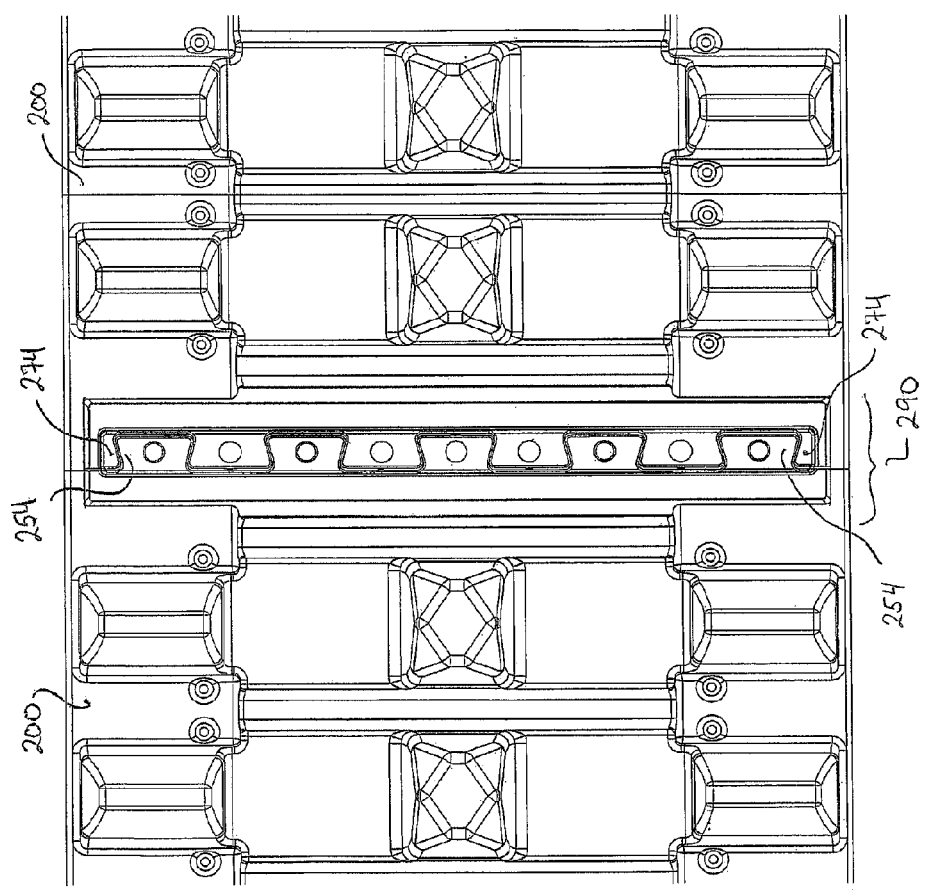
FIG. 10 is a fragmentary plan view of the inner surface of the two portions of the track segments of FIG. 5, without the inner plate assembly.

Referring to FIG. 10, the engagement between the joint portions 254 and 274 of adjacent segments 200 is shown.

The skilled addressee will note that the dovetail joint configuration of the joint portions 254 and 274 provide a good mechanical joint between adjacent segments 200 of the segmented track 100. In addition, having the dovetail joint configuration allows the easy insertion of the joint portion 254 of a first segment 200 into the joint portion 274 of a second segment 200 as the insertion will push out any dirt or other debris which could be present in the joint portion 274.

Figure 4:
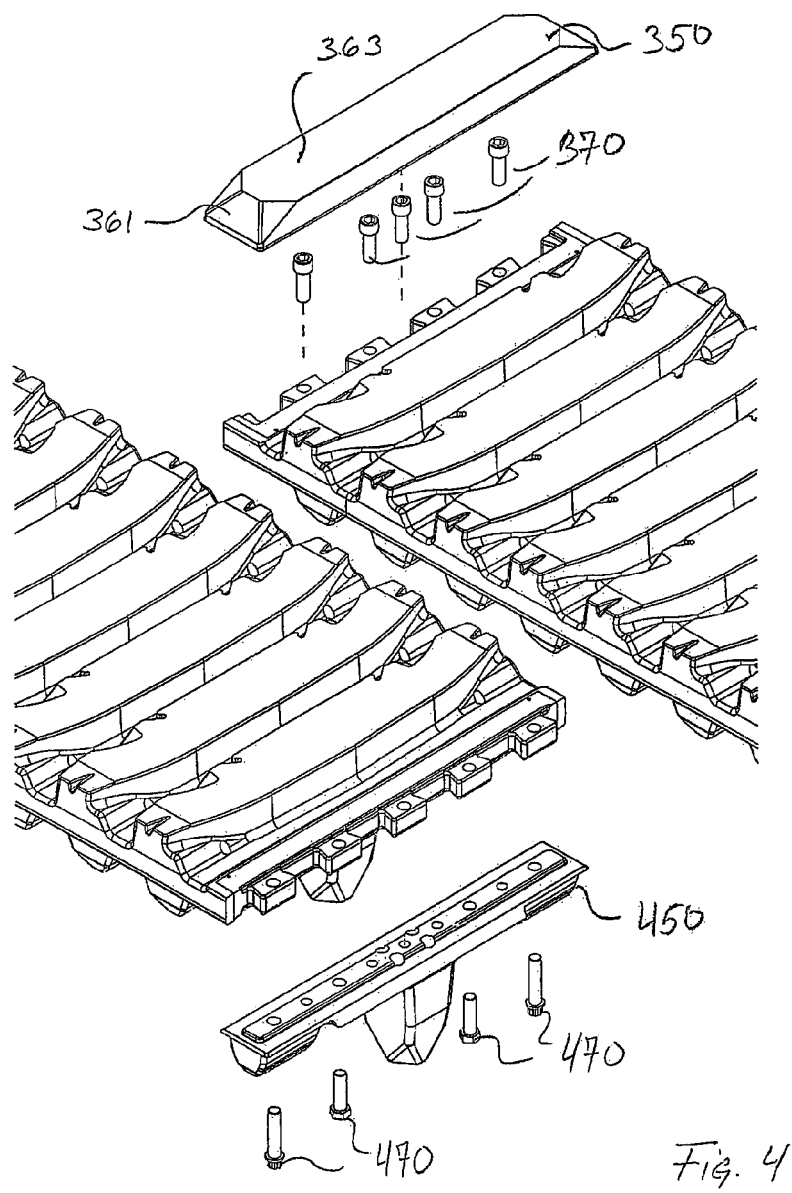
FIG. 4 is a fragmentary exploded perspective view of the exterior of portions of two track segments in accordance with the principles of the present invention, at the joint connection.
Figure 5:
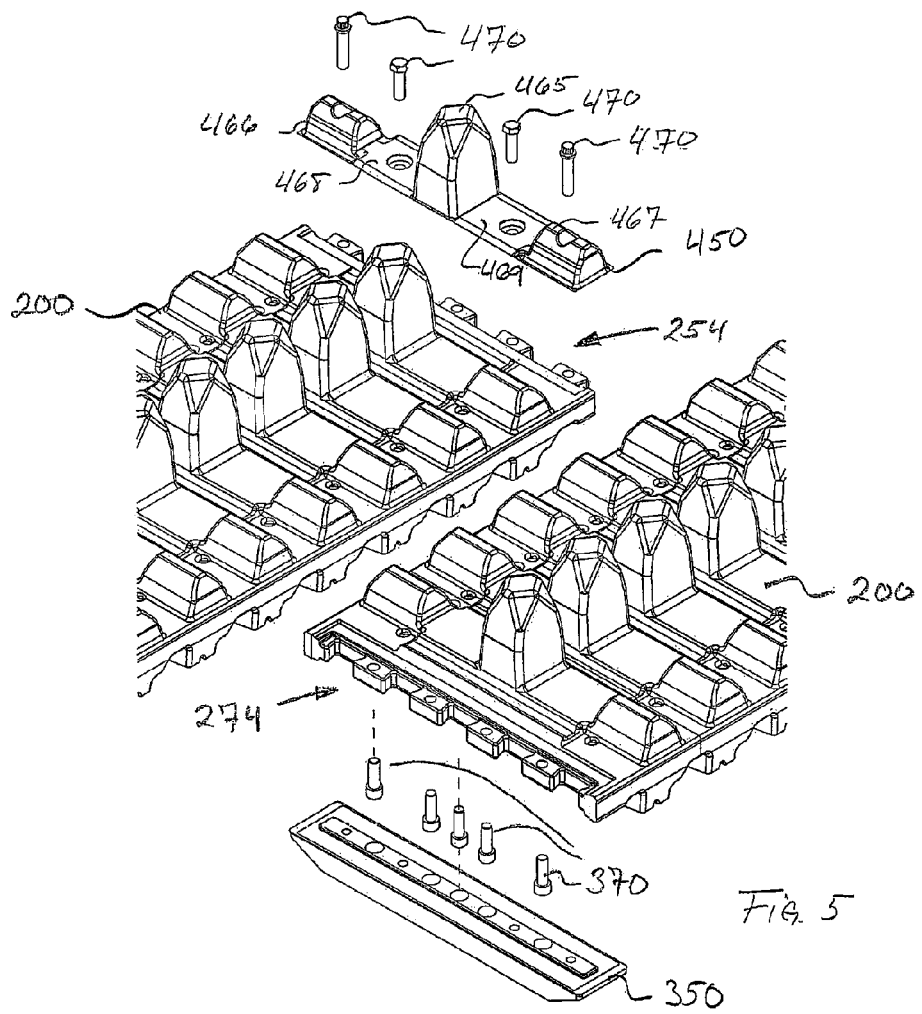
FIG. 5 is a fragmentary exploded perspective view of the interior of the portions of two track segments of FIG. 4, at the joint connection.
Figure 6:
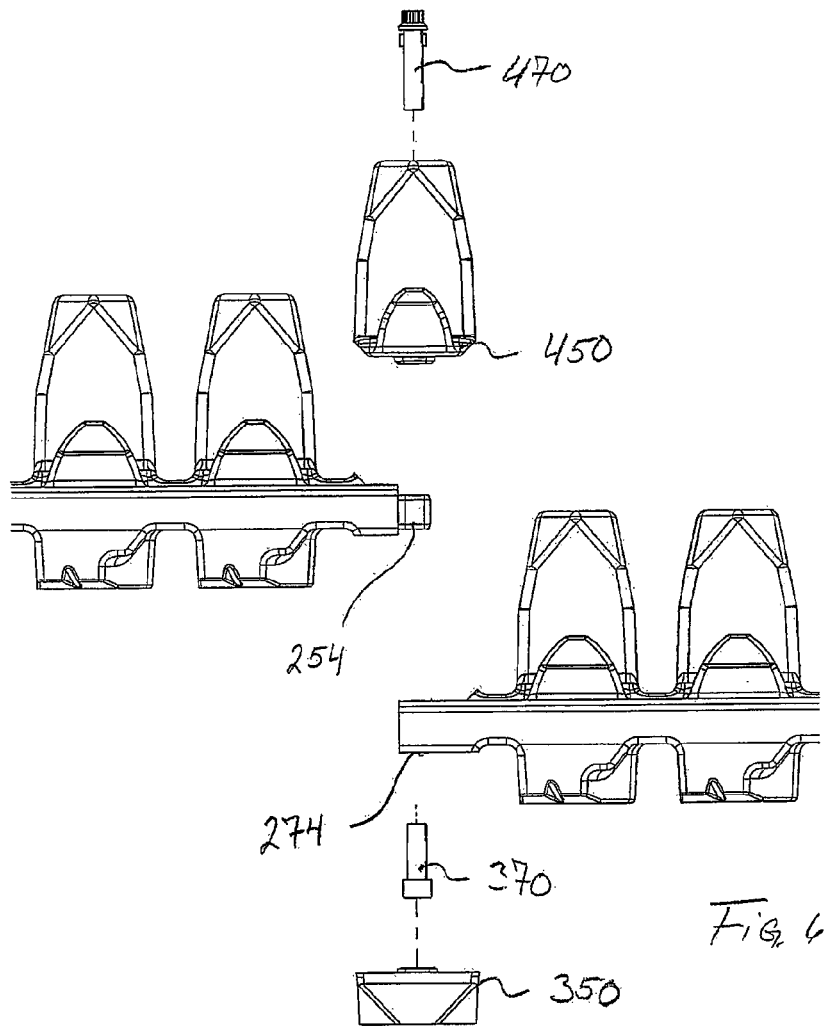
FIG. 6 is a fragmentary exploded side view of the portions of the track segments of FIG. 5.

Referring now to FIGS. 4 to 6, the joint between adjacent segments 200 will be described in more details.

As already indicated, the joint portion 254 of a first segment 200 is configured to be coupled to the joint portion 274 of another segment 200. To further secure the joint portions 254 and 274 together, the segmented track 100 comprises, for each joint, an outer plate assembly 350 and an inner plate assembly 450, both plate assemblies being configured to be fastened together and to the joint portions 254 and 274.

As best shown in FIGS. 4 to 6, the inner plate assembly 450 is fastened to the joint portions 254 and 274 of adjacent segments 200 via outer fasteners 370 while the outer plate assembly 350 is fastened both to the inner plate 450 and to the joint portions 254 and 274 of adjacent segments 200 via inner fasteners 470.

In that sense, to receive the outer and inner fasteners 370 and 470, the tails 256 and 276 of the joint portions 254 and 274 are respectively provided with openings 257 and 277 extending therethrough.

The skilled addressee will note that the present configuration of joints avoids having holes or other apertures in the outer surface 363 of the traction lug 361 of the outer plate assembly 350 (see FIG. 4). Having holes or other apertures in the outer surface 363 would have allowed debris to enter them, which could have causes premature wearing of the outer plate assembly 350.

Once assembled, the joint portions 254 and 274, the inner plate assembly 450 and the outer plate assembly 350 form a substantially rigid section 290 which is common to both adjacent track segments 200, as shown in FIGS. 7 and 8.

Figure 9:
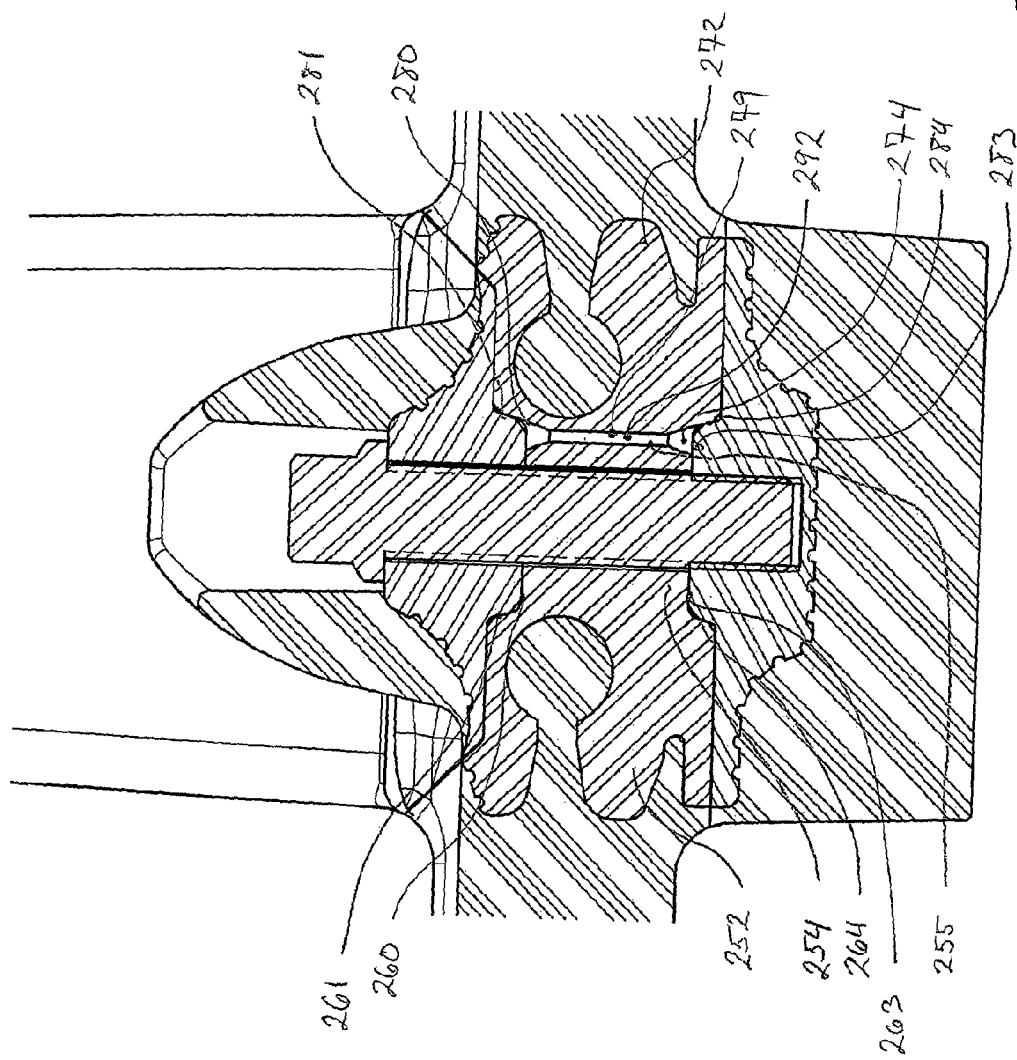
FIG. 9 is a fragmentary and enlarged side view of the joint region of the two portions of the track segments of FIG. 8.

Referring now to FIGS. 8 to 10, the joint will be described in more details.

In the present embodiment, the size of the recesses 258 and 278 of the joint portions is slightly larger than the size of the tails 256 and 276. Having such slightly larger dimensions allow the recesses 258 and 278 to easily respectively receive the tails 276 and 256 of adjacent track segments 200. However, as best shown in FIG. 9, when the tails 256 (or 276) are received in the recesses 278 (or 258) of an adjacent track segment 200, gaps 292 form between the outer extremities 255 (or 275) of the tails 256 (of 276) and the bottoms 279 (259) of the recesses 278 (or 258).

To prevent rattling or wobbling between the joint members 250 and 270, the joint members 250 and 270 are each provided with inner and outer laterally extending recesses 260, 263 and 280, 283.

Inner recesses 260 and 280 are complementary to form a single laterally extending recessed area and are configured to receive a corresponding laterally extending protuberance 455 extending from the inner plate assembly 450.

Similarly, outer recesses 263 and 283 are complementary to form a single laterally extending recessed area and are configured to receive a corresponding laterally extending protuberance 355 extending from the outer plate assembly 350.

The longitudinal edges of 456 and 457 of protuberance 455 and the longitudinal edges of 356 and 357 of protuberance 355 are inwardly angled such as to engage complementary longitudinal angled edges 261 and 281 of recesses 260, 263, and longitudinal angled edges 264 and 284 of recesses 280, 283. As the longitudinal edges of protuberances 355 and 455 are angled, their insertion in the recessed areas defined by recesses 260, 280 and 263, 283, wedge apart joint members 250 and 270. Understandably, the wedging action of the protuberances 355 and 455 prevents rattling between joint members 250 and 270.

Understandably, rattling or wobbling movements between connected joint members 250 and 270 could prematurely decrease their lifespan as the movements would cause premature wearing.

Figure 11:
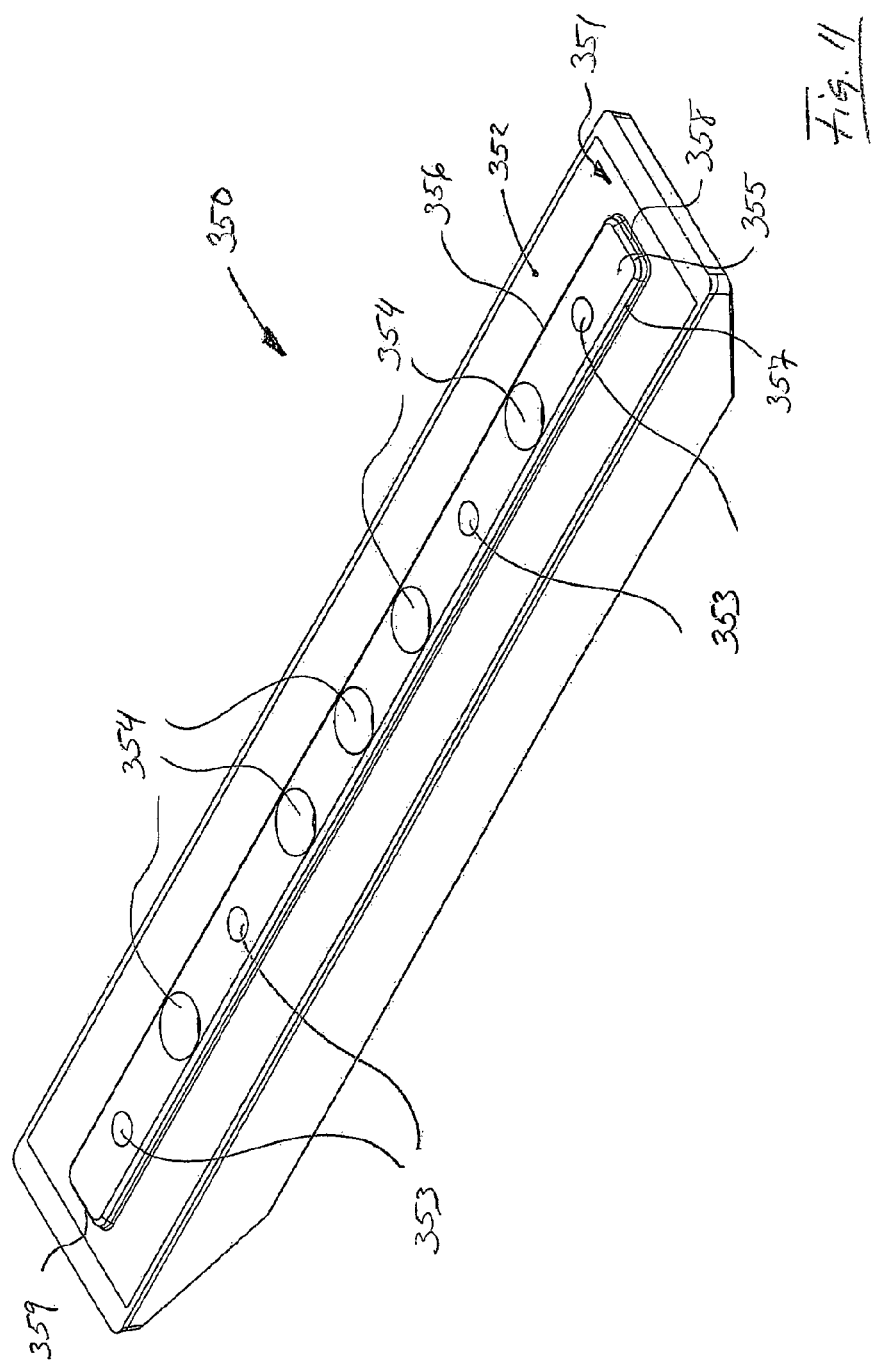
FIG. 11 is a perspective view of an embodiment of the outer plate assembly in accordance with the principles of the present invention
Figure 12:
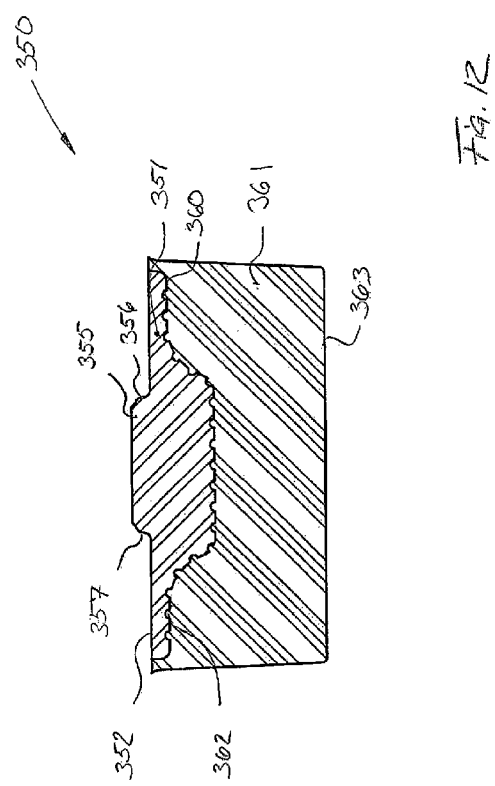
FIG. 12 is a cross-sectional side view of the outer plate of FIG. 11.

Referring now to FIGS. 11 and 12, the outer plate assembly 350 will be described in more details.

In the present embodiment, the outer plate assembly 350 comprises a base plate 351, typically made from metallic material(s), having an inner surface 352 and an outer surface 362.

As already indicated above, the inner surface 352 comprises an outwardly extending protuberance 355 which also extends laterally as shown in FIG. 11. The protuberance 355 defines two longitudinal edges 356 and 357 and two lateral edges 358 and 359. As already mentioned, the two longitudinal edges 356 and 357 are angled to wedge the joint members 250 and 270 when the outer plate assembly 350 is mounted thereto.

In the present embodiment, the two lateral edges 358 and 359 are also angled to provide a snug fit with the outer recesses 263 and 283 of the joint members 250 and 270.

As best shown in FIG. 11, the protuberance 355 also comprises holes or apertures 353 and 354. Holes 353 are configured to receive the threaded extremities of the inner fasteners 470 while holes 354 are configured to receive the heads of the outer fasteners 370.

The outer surface 362 of the base plate 351 is covered with elastomeric material generally shaped as an outer ground-engaging lug 361. In order to provide good adhesion between the elastomeric material of the lug 361 and the base plate 351, the outer surface 362 of the base plate 351 is provided with laterally extending grooves 360.

In the present embodiment, it has been found advantageous to have the shape or configuration of the lug 361 less aggressive, or less ground-engaging, than the regular ground-engaging lugs 310 of the track segments 200. Indeed, having such less aggressive configuration for the lug 361 decreases the strain applied to the bond between the elastomeric material of the lug 361 and the metallic base plate 351 as the lug 361 contacts and engages the ground.

Figure 13:
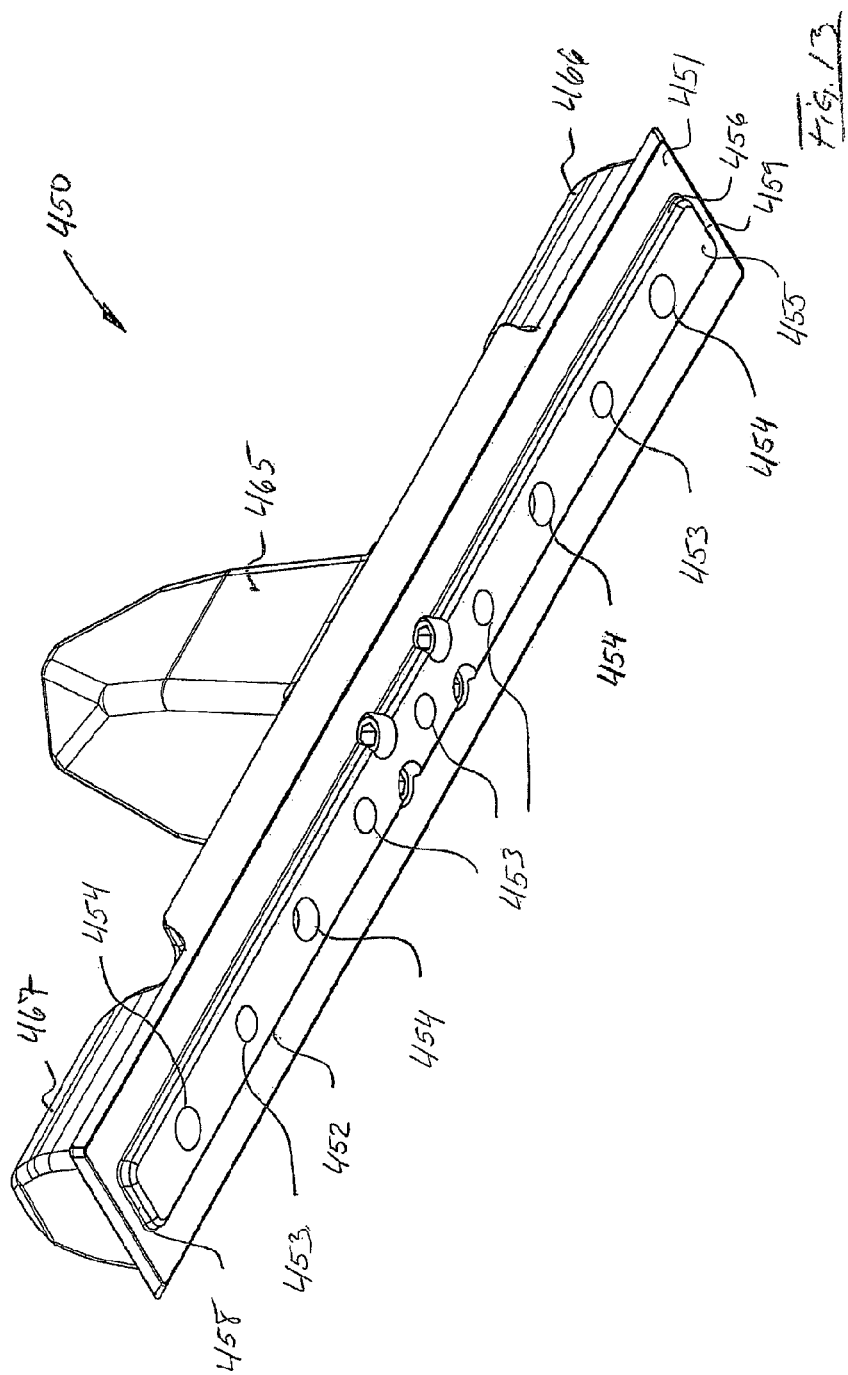
FIG. 13 is a perspective view of an embodiment of the inner plate assembly in accordance with the principles of the present invention
Figure 14:
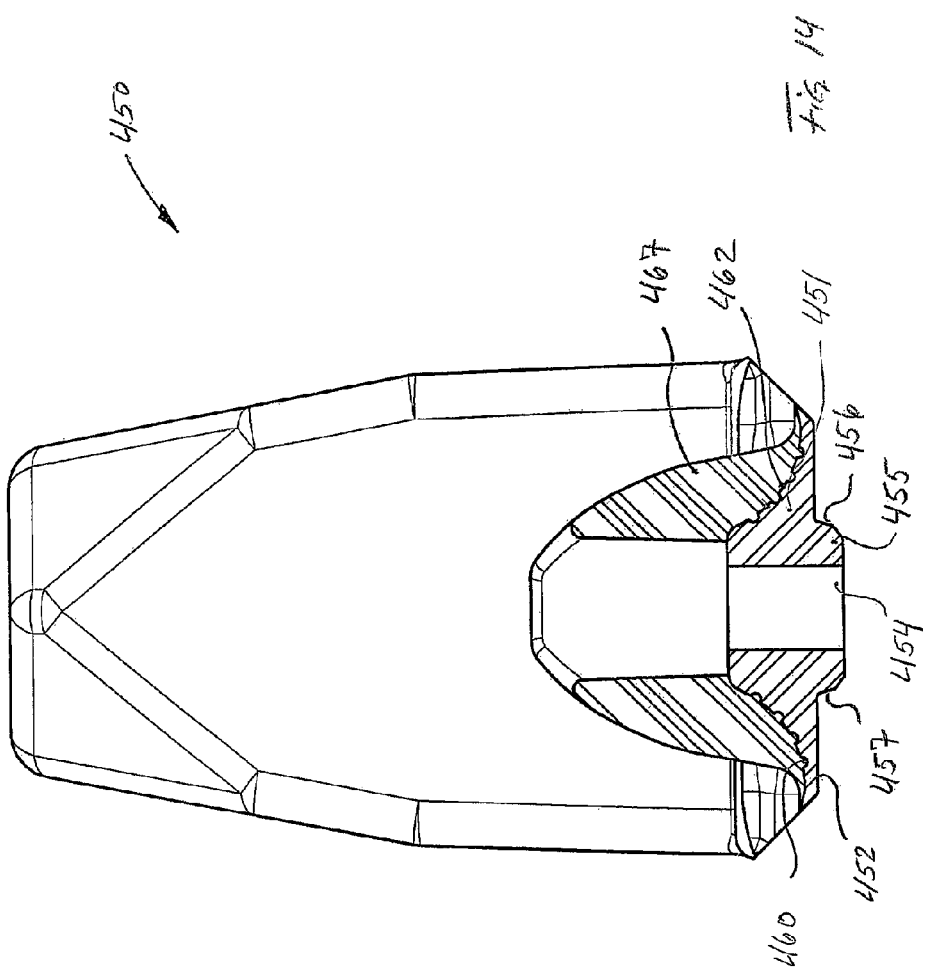
FIG. 14 is a cross-sectional side view of the outer plate of FIG. 13, along a drive lug.
Figure 15:
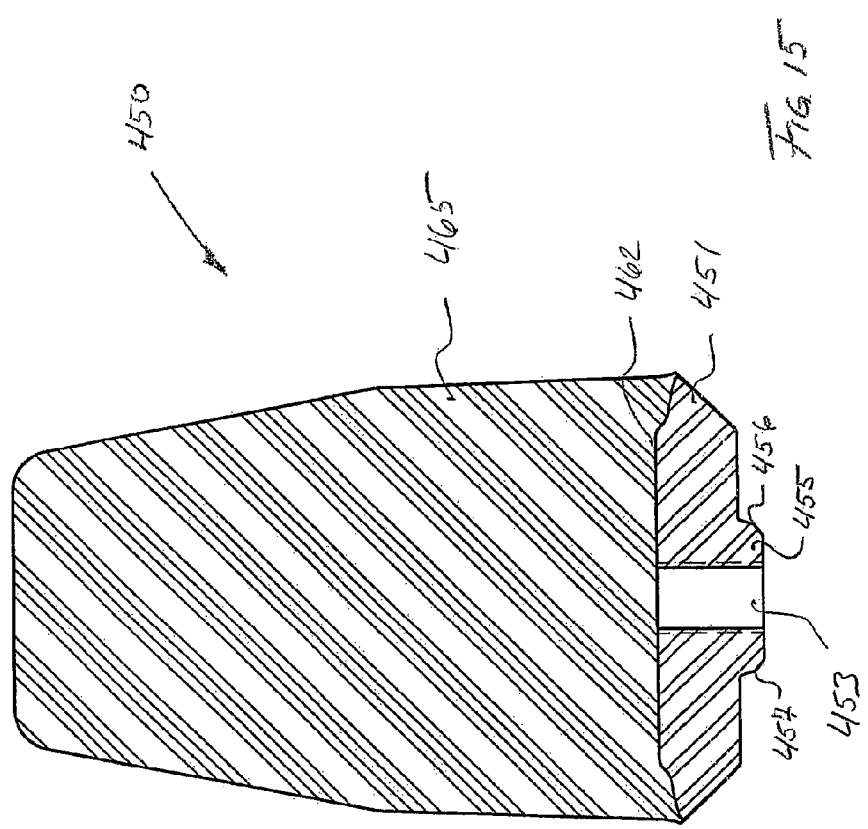
FIG. 15 is a cross-sectional side view of the outer plate of FIG. 13, along a guide lug.
Figure 16:
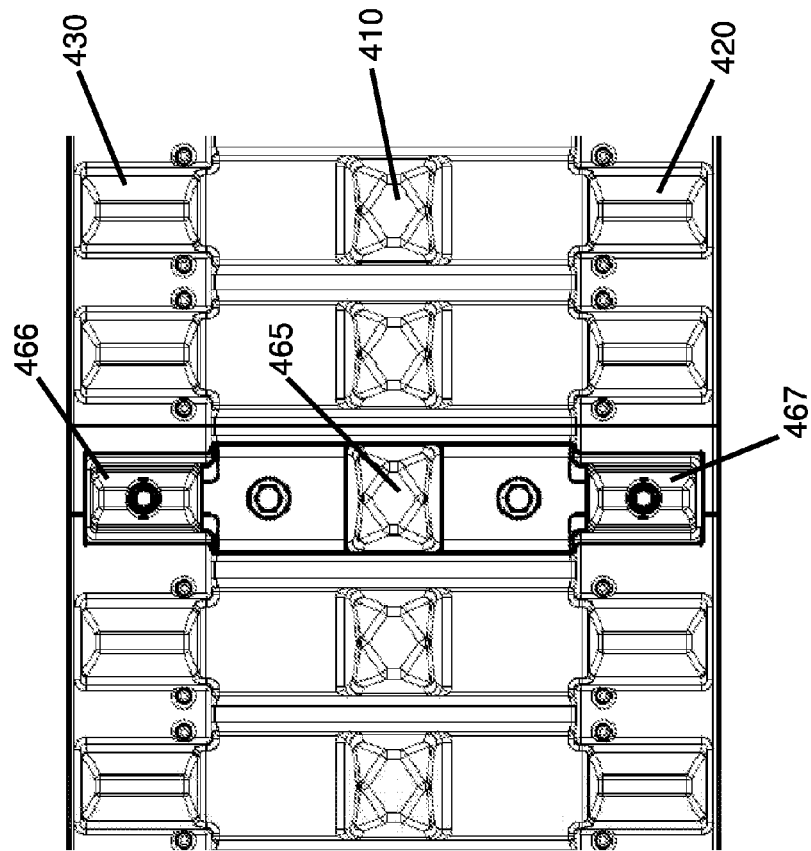
FIG. 16 is a plan view of the inner surface of the track segment in accordance with the principles of the present invention.
Figure 17:
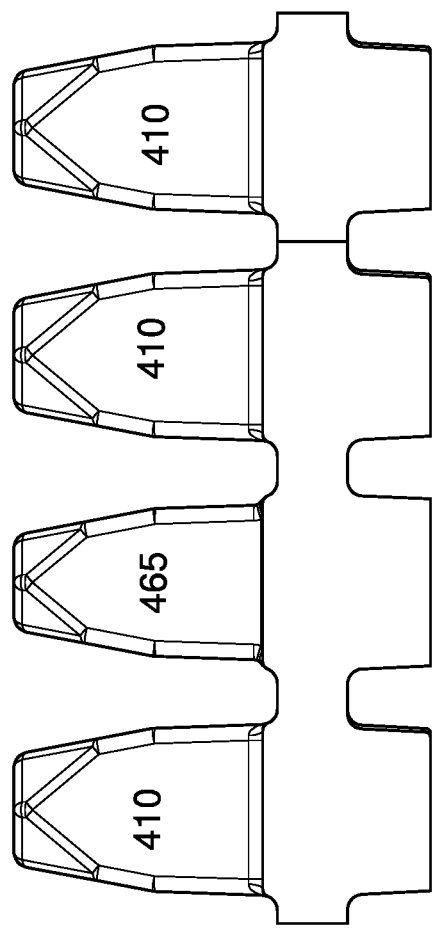
FIG. 17 is a fragmentary cross-sectional side view of the track segment of FIG. 16.

Referring now to FIGS. 13 to 15, the inner plate assembly 450 is shown in more details.

As for the outer plate assembly 350, the inner plate assembly comprises a basic plate 451, typically made from metallic material(s), having an inner surface 452 and an outer surface 462.

As already mentioned, the inner surface 452 comprises an outwardly extending protuberance 455 which also extends laterally as shown in FIG. 13. The protuberance 455 defines two longitudinal edges 456 and 457 and two lateral edges 458 and 459. As already mentioned, the two longitudinal edges 456 and 457 are angled to wedge the joint members 250 and 270 when the outer plate assembly 450 is mounted thereto.

In the present embodiment, the two lateral edges 458 and 459 are also angled to provide a snug fit with the inner recesses 260 and 280 of the joint members 250 and 270.

As best illustrated in FIG. 13, the protuberance 455 comprises holes or apertures 453 and 454. Holes 453 are configured to receive the threaded extremities of the outer fasteners 370. For their part, holes 454, which extend through the inner plate assembly 450 as shown in FIGS. 9 and 14, are configured to allow the passage of the shank of the inner fasteners 470.

As best shown in FIGS. 5 and 13-15, the outer surface 462 of the base plate 451 is provided with one guide lug 465 and two drive lugs 466 and 467. The guide lug 465 and drive lugs 466 and 467 are made from elastomeric material and are laterally spaced apart to define wheelpaths 468 and 469. Understandably, the configuration and placement of the guide lug 465 and drive lugs 466 and 467 are essentially similar to the configuration and placement of the guide lug 410 and drive lugs 420 and 430 of the track segments 200.

In the present embodiment, the wheelpaths 468 and 469 are not covered with elastomeric material. Still, in other embodiments, the wheelpaths 468 and 469 could be covered with elastomeric material.

Though the guide lug 465 is similar in configuration to the regular guide lugs 410, it has been found advantageous to have the guide lug 465 slightly shorter (in a longitudinal direction of the track 100) and slightly narrower (in a lateral direction of the track 100) than regular guide lugs 410 to compensate for the slightly different behavior (e.g. reduced flexibility) of the joint section 290 during operation. Similarly, though the drive lugs 466 and 467 are similar in configuration to the drive lugs 420 and 430, it has also been found advantageous to have the drive lugs 466 and 467 slightly shorter (in a longitudinal direction of the track 100) and slightly narrower (in a lateral direction of the track 100) than regular guide lugs 410 to compensate for the slightly different behavior (e.g. reduced flexibility) of the joint section 290 during operation.

Referring back to FIG. 14, the outer surface 462 of the base plate 451 is provided with laterally extending grooves 460 to provide good adhesion between the elastomeric material of the drive lug 466 and 467.

However, in the present embodiment, the grooves 460 only extend under the drive lugs 466 and 467. The grooves 460 do not extend along the wheelpaths 468 and 469 and under the guide lug 465 which is fastened (e.g. bolted) to the base plate 451 (see FIG. 13).

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A track segment comprising a segment body made of reinforced elastomeric material and comprising an outer ground-engaging surface, an inner wheel-engaging surface, a first lateral edge, a second lateral edge, a first extremity and a second extremity, the segment body comprising a plurality of laterally extending and substantially rigid lug-bearing sections which are interconnected by laterally extending and substantially flexible lug-less sections, each of the lug-bearing sections comprising, on the inner surface, at least one inner lug, and, on the outer surface, at least one outer lug, the segment body being respectively terminated, at the first and second extremities, by two of the lug-less sections, the track segment comprising a first joint element mounted at the first extremity of the segment body, and a second joint element mounted at the second extremity of the segment body, the first and second joint elements being configured to form a common substantially rigid joint section when connected together; the first joint element comprising a first anchoring portion and a first joint portion having a first dovetail configuration, and the second joint element comprising a second anchoring portion and a second joint portion having a second dovetail configuration which is complementary to the first dovetail configuration.

2. A track segment as claimed in claim 1, wherein the track segment comprises an inner plate assembly and an outer plate assembly configured to be secured to the first and second joint elements and to each other.

3. A track segment as claimed in claim 2, wherein the inner plate assembly comprises a wheel-engaging surface which comprises at least one inner lug.

4. A track segment as claimed in claim 3, wherein the at least one inner lug located on the inner plate assembly is shorter than the at least one inner lug located on each of the lug-bearing sections.

5. A track segment as claimed in claim 4, wherein the at least one inner lug located on the inner plate assembly is at least one drive lug, and wherein the at least one inner lug located on each of the lug-bearing sections is at least one drive lug.

6. A track segment as claimed in claim 4, wherein the at least one inner lug located on the inner plate assembly is at least one guide lug, and wherein the at least one inner lug located on each of the lug-bearing sections is at least one guide lug.

7. A track segment as claimed in claim 3, wherein the at least one inner lug located on the inner plate assembly is narrower than the at least one inner lug located on each of the lug-bearing sections.

8. A track segment as claimed in claim 2, wherein the outer plate assembly comprises a ground-engaging surface which comprises at least one outer lug.

9. A track segment as claimed in claim 2, wherein the first joint element and the second joint element are configured to be secured to the inner plate assembly, and wherein the inner plate assembly is configured to be secured to the outer plate assembly.

10. A track segment as claimed in claim 2, wherein the inner and outer plate assemblies shield the first and second joint elements when the inner and outer plate assemblies are mounted to jointed first and second joint elements.

11. A track segment as claimed in claim 1, wherein the segment body comprises longitudinally extending reinforcing elements which are mounted to and extending between the first anchoring portion and the second anchoring portion.

12. A track segment as claimed in claim 11, wherein the first anchoring portion and the second anchoring portion are substantially C-shaped, and wherein the reinforcing elements are terminated with first and second fittings which are respectively received into the first anchoring portion and the second anchoring portion.

13. A track segment as claimed in claim 1, wherein the at least one inner lug located on each of the lug-bearing sections comprises a plurality of laterally spaced-apart inner lugs.

14. A track segment as claimed in claim 13, wherein some of the plurality of laterally spaced-apart inner lugs define wheelpath therebetween.

15. A track segment as claimed in 13, wherein the plurality of laterally spaced-apart inner lugs located on each of the lug-bearing sections comprises at least one drive lug and at least one guide lug.

16. A segmented track comprising a plurality of track segments as claimed in claim 1, connected end-to-end.

17. A vehicle having mounted thereto a segmented track as claimed in claim 16.

* * * * *